United States Patent [19]

Breen et al.

[11] Patent Number: 5,415,466
[45] Date of Patent: May 16, 1995

[54] SYSTEM AND METHOD FOR DETERMINING RELATIVE BRAKE FACTORS

[75] Inventors: Michael T. Breen, Garden City; Chia-Hsiang Liu, Northville, both of Mich.

[73] Assignee: Eaton Corporation, Cleveland, Ohio

[21] Appl. No.: 232,722

[22] Filed: Apr. 22, 1994

[51] Int. Cl.⁶ .............................................. B60T 13/00
[52] U.S. Cl. ........................................ 303/7; 188/3 R; 188/181 T; 303/9.61; 303/9.62; 303/100; 303/DIG. 3; 303/DIG. 4; 303/112; 303/20
[58] Field of Search ............................. 303/7-8, 303/DIG. 4, 2-3, 6.01, 9.61, 9.62, 9.66, 9.69, 13-17, 20, 100, 102-110, 113.4, 113.5, 22.1, 112, DIG. 3; 188/3 R, 3 H, 181 C, 181 A, 1.11, 195, 349, 181 T, 106 P

[56] References Cited

U.S. PATENT DOCUMENTS

4,093,316 6/1978 Reihecke ................ 303/DIG. 4
5,312,168 5/1994 Breen ..................... 188/181 T Primary Examiner—Douglas C. Butler
Attorney, Agent, or Firm—Brooks & Kushman

[57] ABSTRACT

A large articulated vehicle, such as a tractor semi-trailer truck often has a number of braking locations each having a number of brake sites. To properly balance the work performed at the various brake sites in decelerating the vehicle, it is necessary to determine the relative brake factors of each site. The brake factors characterize the braking performance for a particular delivered braking pressure. A system and method for determining the relative brake factors for such a vehicle is provided. The vehicle is decelerated at a known rate while delivered braking pressure is measured and recorded for each braking location. A system of simultaneous equations is then solved to determine the relative brake factors. Once the brake factors have been determined during a sequence of controlled braking events, subsequent braking may be modified to achieve a work-balanced braking mode.

18 Claims, 4 Drawing Sheets

SYSTEM AND METHOD FOR DETERMINING RELATIVE BRAKE FACTORS

TECHNICAL FIELD

The present invention relates to a system and method for determining relative brake factors among two or more brake locations in a vehicle.

BACKGROUND ART

A wide variety of vehicle braking systems may be found in the prior art. A myriad of applications ranging from small passenger vehicles to large, tractor semi-trailer trucks, employ differing structure and control methods to achieve the common goal of effectively and reliably decelerating the vehicle. The advent of inexpensive microprocessors has enabled more sophisticated control strategies. As is well known, a typical microprocessor based control system receives signals from vehicle sensors to monitor various vehicle operating parameters. This information is then used by a control program which energizes appropriate outputs to effect control of the vehicle.

Articulated vehicles, such as tractor semi-trailer trucks, often present unique problems in designing a braking system which are not encountered when designing braking systems for small passenger vehicles. One such problem is the number and location of braking sites required to properly decelerate a large articulated vehicle compared to those required for a small passenger vehicle. Typically, articulated vehicles require brakes on each segment of the vehicle. The braking control system must coordinate control of the various brake sites such that they operate in concert to properly decelerate the vehicle. Coordinated control may be accomplished with a single electronic control unit (ECU), or utilizing multiple processors arranged in a master/slave configuration.

Typically, more sophisticated control strategies require more information pertaining to the current vehicle operating parameters. This allows the control system to dynamically respond to changing operating conditions. Often, a number of operating modes are utilized to better respond to the current operating conditions. For example, a vehicle braking system may have a work balancing mode, a proportioning mode, and an anti-lock braking mode. The proper mode is selected based on the current operating conditions as determined by various vehicle sensors.

The object of a work-balanced braking mode, as its name suggests, is to balance the work performed in decelerating the vehicle among the various braking sites. The work performed at a particular braking location depends upon a number of factors. These factors may include the pressure delivered to the braking location, the number of brake sites at that location, the loading of the vehicle at that location, and the performance characteristics of the individual brakes at that location.

The braking system ECU utilizes this information to balance the work performed at the various brake locations by controlling the pressure delivered to each location. Thus, to achieve proper work balancing, it is necessary to determine how a particular location will respond to a particular delivered pressure relative to other braking locations. This relationship may be characterized by determining a relative brake factor for each braking location.

It would therefore be desirable to provide a method and system for determining relative brake factors. Once the relative brake factors are known, the vehicle braking system ECU can use this information to effect a work-balanced braking mode by delivering the appropriate amount of braking pressure to each braking location.

SUMMARY OF THE INVENTION

It is, therefore, an object of the present invention to provide a system for determining relative brake factors.

It is an additional object of the present invention to provide a system for determining relative brake factors during a controlled braking maneuver which incorporates standard sensors typically found on vehicles equipped with electronically controlled braking systems.

Another object of the present invention is to provide a system for determining relative brake factors for use in balancing the work performed at various braking locations.

In carrying out the above objects and other objects and features of the present invention, a system is provided for determining relative brake factors during a controlled braking maneuver comprising means for decelerating the vehicle at a predetermined rate during the controlled braking maneuver, means for determining the delivered braking pressure at each of the vehicle braking locations, means for determining a brake factor for a particular braking location relative to another braking location, and means for controlling the vehicle braking based on the relative brake factors. A method is also provided for use with the system.

The above objects and other objects, features, and advantages of the present invention will be readily appreciated by one of ordinary skill in the art from the following detailed description of the best mode for carrying out the invention when taken in conjunction with the accompanying drawings.

BEST MODE(S) FOR CARRYING OUT THE INVENTION

Figure 1:
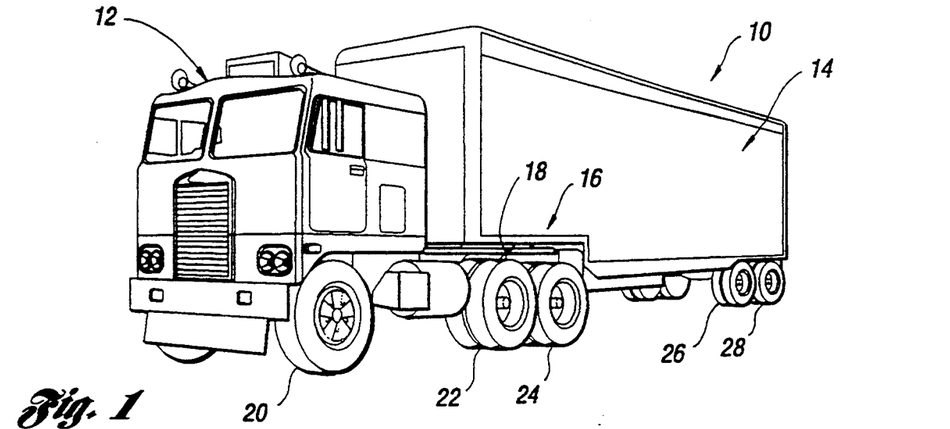
FIG. 1 is a diagrammatic representation of a tractor semi-trailer vehicle of the system for determining relative brake factors according to the present invention.

FIG. 1 depicts a typical tractor semi-trailer vehicle, indicated generally by reference numeral 10, which is well known in the art. Although the present invention is particularly suited to such vehicles, it would also work well with other types of articulated vehicles or any other vehicle which attempts to balance work performed during braking among several braking locations. Vehicle 10 includes a tractor 12 detachably coupled to a trailer 14 via a coupling means which includes a king pin 16 (best illustrated in FIG. 3) which is located on trailer 14, and a fifth wheel 18 (also shown in FIG. 2) which is mounted on tractor 12. The fifth wheel/king pin arrangement is well known in the art.

Tractor 12 typically includes a non-driven steer axle 20 and tandem drive axles 22 and 24. Of course, the present invention would work equally well with a front-wheel-drive system. Trailer 14 typically includes tandem trailer axles 26 and 28. Of course, tractor 12 could include a single drive axle and trailer 14 could include a single axle or multiple axles which are steerable, non-steerable, driven, or non-driven.

Figure 2:
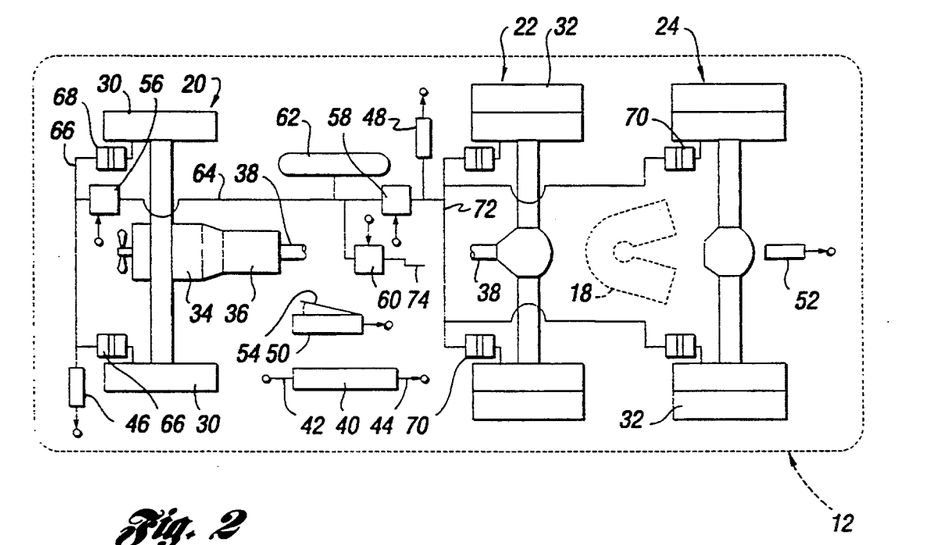
FIG. 2 is a block diagram illustrating a braking control system mounted on the tractor of the vehicle of FIG. 1 of the system for determining relative brake factors according to the present invention.

Referring now to FIG. 2, there is shown a braking system which is mounted on tractor 12 of vehicle 10 illustrated in FIG. 1. The braking system is operative to decelerate wheels 30 associated with steer axle 20, and wheels 32 associated with tandem drive axles 22 and 24. The tractor includes an engine 34 coupled to a transmission 36 for delivering power to driven wheels 32 via driveline 38.

With continuing reference to FIG. 2, the braking system is controlled by an electronic control unit (ECU) 40 which gathers information pertaining to current vehicle operating parameters via input means 42. ECU 40 executes a predetermined set of instructions which utilize the information gathered to effect control of the system through output means 44. Inputs in communication with ECU 40 via input means 42 include a steer axle pressure transducer 46, a drive axle pressure transducer 48, a brake pedal sensor 50, and a vehicle deceleration sensor 52, among others. Brake pedal sensor 50 is used to determine the position of brake pedal 54 which indicates requested braking demand.

Outputs in communication with ECU 40 via output means 44 effect control of the system. These outputs include steer axle pressure control valve 56, drive axle pressure control valve 58, and trailer axle pressure control valve 60, among others. The actual connections between ECU 40 and the various inputs and outputs are not shown for the sake of clarity.

The braking system illustrated in FIG. 2 is pneumatically actuated. However, the system and method of the present invention could be utilized with a hydraulic braking system as well. The system of FIG. 2 includes a compressed air supply tank 62 which supplies compressed air to the braking system via main supply line 64. Compressed air is delivered to steer axle brake chambers 66, after passing through steer axle pressure control valve 56, via steer axle supply line 68. Similarly, compressed air is delivered to drive axle brake chambers 70 via drive axle supply line 72 after passing through drive axle pressure control valve 58. Likewise, compressed air is delivered to trailer 14 via traactor pilot supply line 74, as described in greater detail below.

Figure 3:
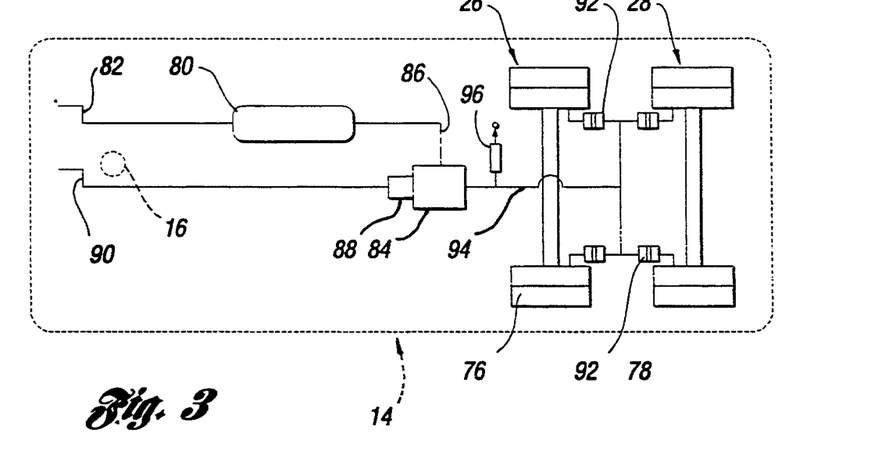
FIG. 3 is a block diagram of a braking control system mounted on the trailer of the vehicle of FIG. 1 of the system for determining relative brake factors according to the present invention.

Referring now to FIG. 3, a brake control system is illustrated which is mounted on trailer 14 of vehicle 10 of FIG. 1. As previously noted, trailer 14 includes king pin 16 for selective engagement and disengagement to tractor fifth wheel 18. Trailer 14 also preferably includes tandem trailer axles 26 and 28, each having associated dual trailer wheels 76 and 78.

As also shown in FIG. 3, trailer 14 includes a pressurized air supply tank which is fluidly connected to the tractor air system via connecting means 82. Typically, connecting means 82 is selectively engageable with the tractor air system to allow coupling and decoupling of the trailer. Air supply tank 80 is also connected to the inlet port of a pressure relay valve 84 via fluid connecting means 86. Pressure relay valve 84 includes a pilot portion 88 which is connected to trailer pilot supply line 90. Trailer pilot supply line 90 may be selectively coupled to tractor pilot supply line 74 so as to allow disengagement of trailer 14 from tractor 12. Pressure relay valve 84 is also connected to trailer brake chambers 92 via trailer supply line 94. Trailer brake pressure transducer 96 senses the air pressure in trailer supply line 94 and communicates that information to ECU 40 via inputs 42, as previously indicated.

In operation, a vehicle operator indicates a desire to operate the vehicle brakes by depressing brake pedal 54 which is mechanically connected to the brake system pneumatic supply. Brake pedal sensor 50 indicates the travel of brake pedal 54 and relays this information to ECU 40 via input means 42. The mechanical linkage allows the brake pedal 54 to release compressed air from a supply tank, such as compressed air supply tank 62. A large, articulated vehicle, such as a tractor semi-trailer truck, may have several such supply tanks, only one of which is shown for the sake of clarity. ECU 40 determines an appropriate braking mode for the current operating conditions. When in a work-balanced braking mode, for example, ECU 40 attempts to balance the work performed by the various braking sites situated at the various braking locations corresponding to steer axle 20, tandem drive axles 22 and 24, and tandem trailer axles 26 and 28. Whereas in an ABS braking mode, ECU 40 attempts to prevent any individual brake site from locking.

Once an appropriate braking mode is determined, ECU 40 transmits control signals via output means 44 to pressure control valves 56, 58 and 60. The pressure control valves have the ability to exhaust compressed air being delivered to their inlet ports via supply line 64 so as to regulate the air pressure at their outlet ports which are connected to the various braking chambers via supply lines 68, 72 and 74. The actual air pressure delivered to the various braking locations is monitored by pressure transducers 46, 48 and 96 so as to effect a closed-loop feedback control system.

The brake torque produced at each braking location, then, is a function of the applied air pressure, the number of brake sites at that location, the wheel radius, and the particular performance of each brake. As noted previously, the performance of each brake relative to the other brakes may be characterized by a relative brake factor. Determination of the relative brake factors is described in greater detail below.

The trailer braking system illustrated in FIG. 3 is also controlled by ECU 40 and functions in a manner similar to the braking system of FIG. 2. ECU 40 controls the air pressure in tractor pilot supply line 74 via pressure control valve 60 which is in communication with ECU 40 via output means 44. Tractor pilot supply line 74 is connected to trailer pilot supply line 90. The air pressure present in trailer pilot supply line 90 then regulates the pressure delivered by trailer compressed air supply tank 80 to trailer brake supply line 94. Brake chambers 92 utilize the air pressure to apply brakes at each of the four trailer brake sites.

Figure 4:
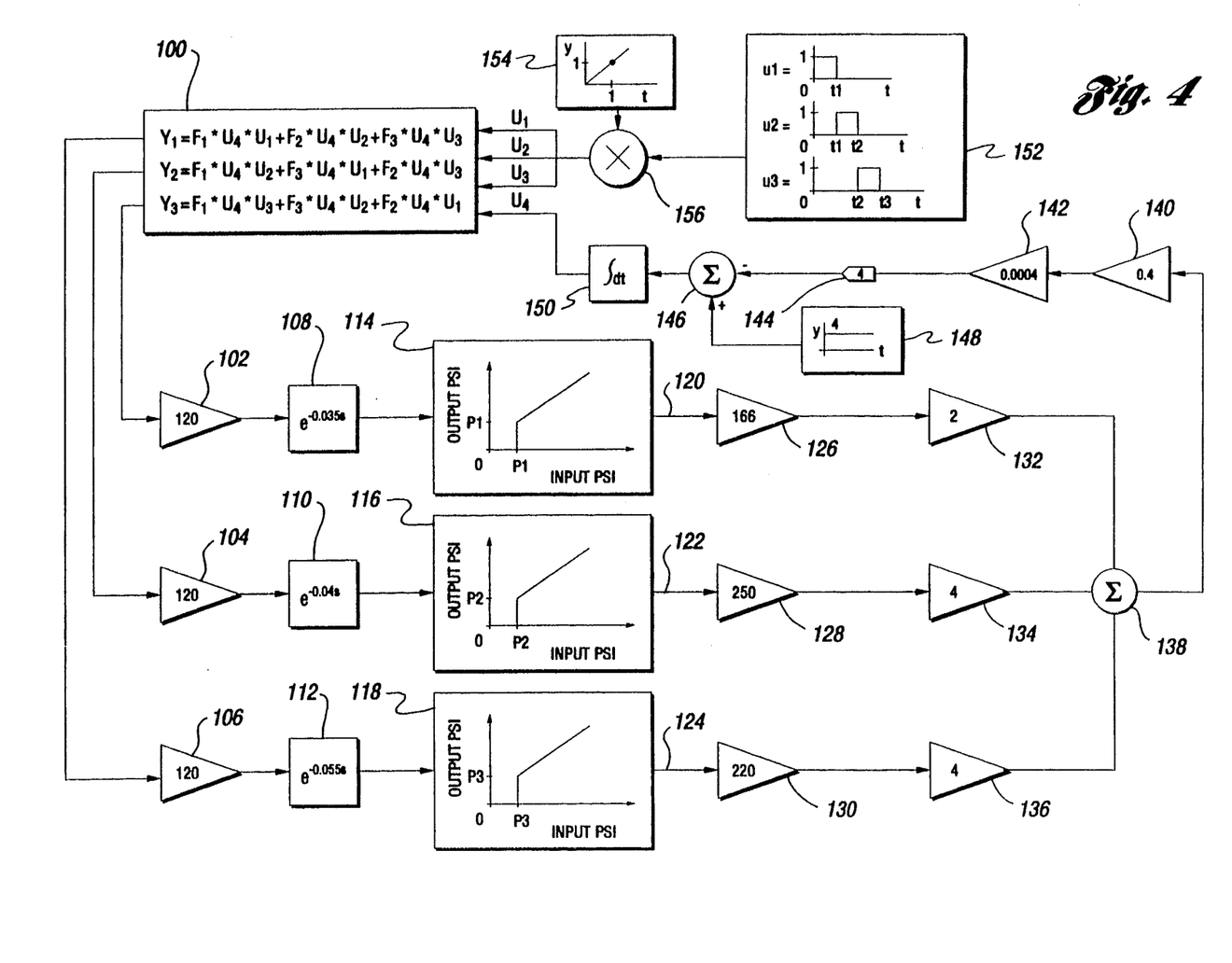
FIG. 4 is a block diagram illustrating the operation of the system for determining relative brake factors according to the present invention.

In FIG. 4, a block diagram illustrating the operation of the system for determining relative brake factors according to the present invention is shown. The system is also used to determine the relative vehicle mass as disclosed in U.S. patent application Ser. No. 08/232,716, filed Apr. 22, 1994 entitled "System And Method For Determining Relative Vehicle Mass", assigned to the assignee of the present invention, the specification of which is hereby incorporated by reference in its entirety. Determination of the relative brake factors may utilize the relative vehicle mass, the actual vehicle mass, or an arbitrarily assigned vehicle mass, as explained in greater detail below, since the factors are relative.

As shown in FIG. 4, the system for determining relative brake factors is a closed-loop control system. Preferably, the computations shown throughout are performed by ECU 40. Each equation shown in block 100 represents a vehicle axle, or a set of tandem axles. Thus, since the vehicle illustrated includes three such axles, one equation is associated with steer axle 20, another equation is associated with tandem drive axles 22,24, and a third equation is associated with tandem trailer axles 26,28. Of course, the system could be easily adapted to a vehicle having more or less than three axles, or sites with different braking characteristics, each having an associated control equation.

With continuing reference to FIG. 4, block 100 generates values for control variables $Y_1$, $Y_2$, and $Y_3$, which respectively correspond to tandem trailer axles 26,28; tandem drive axles 22,24; and steer axle 20. The control variables have a value between zero and unity, inclusive, based upon inputs $U_1$ through $U_4$, and proportioning factors $F_1$ through $F_3$. The proportioning factors represent a division of the total braking force among the various braking locations and are chosen such that the sum of the proportioning factors is unity. In one embodiment, the proportioning factors were chosen to be 0.5, 0.3, and 0.2, corresponding respectively to $F_1$, $F_2$ and $F_3$. However, the proportioning factors may vary depending upon the particular application, and the particular braking mode.

Blocks 102 through 142 represent the brake characteristics of the steer, drive, and trailer axles, as well as the wheel radius and mass of the tractor semi-trailer vehicle. Control values $Y_1$, $Y_2$, and $Y_3$ are multiplied by an appropriate scaling factor at gain blocks 102, 104, and 106, respectively. In the embodiment illustrated in FIG. 4, the scaling factors have a value of "120" which represents a typical system supply pressure in pounds per square inch (psi) as provided by air supply tanks 62 and 80. Of course, the various supply tanks could have different pressures, or a different system of units could be used, which may require an appropriate adjustment to the corresponding scaling factors.

Still referring to FIG. 4, each output of the gain blocks is multiplied by its respective time delay factor at time delay blocks 108, 110, and 112. Time delay block 108 is an exponential function with a time constant, the value of which is representative of the inherent delay between actual and commanded pressure introduced by the steer axle air supply line 68. Similarly, time delay block 110 has a time constant, the value of which is representative of the delay due to the drive axle air supply line 72. Likewise, time delay block 112 has a time constant, the value of which is representative of the delay due to the trailer axle air supply line 94.

Also shown in FIG. 4, outputs of time delay blocks 108, 110, and 112 are connected to transfer blocks 114, 116, and 118, respectively. The transfer blocks contain the transfer function representative of the "crack pressures" $P_1$, $P_2$, and $P_3$ of pressure control valves 56, 58, and 60, respectively. The transfer functions are obtained by plotting the output pressure of each valve as a function of the input pressure at that valve. Thus, the output pressure is near zero until the input pressure exceeds the crack pressure, at which time the valve opens and the output pressure follows the input pressure.

The output of block 114 shown at 120 represents the actual braking pressure applied to the braking sites situated at the steer axle 20 which is measured by steer axle pressure transducer 46. Similarly, outputs 122 and 124 represent the actual braking pressure applied to the braking sites situated at the tandem drive axles and tandem trailer axles, respectively. These pressures are measured by the corresponding pressure transducers 48 and 96, respectively. The braking pressures are then multiplied by the corresponding relative brake factors at blocks 126, 128 and 130, respectively. The relative brake factors are determined during a sequence of controlled braking maneuvers as described below.

With continuing reference to FIG. 4, the outputs of blocks 126, 128 and 130 are then multiplied by the corresponding number of brake sites at each axle by blocks 132, 134 and 136, respectively. In one embodiment, the steer axle has two (2) brake sites and the tandem drive axles and tandem trailer axles each have four (4) brake sites as indicated by the number of brake chambers at each axle (or axle pair). The outputs of blocks 132, 134, and 136 are then summed at block 138. Thus, the output of block 138 represents the total amount of braking torque being applied to the wheels of the vehicle. This total braking torque is multiplied by the reciprocal of the vehicle wheel radius at block 140 to produce the total braking force applied to decelerate the vehicle. The total braking force is then multiplied by the reciprocal of the vehicle mass at block 142 to generate vehicle deceleration.

With continuing reference to FIG. 4, the output of block 142, as shown by reference numeral 144, is subtracted from a predetermined reference deceleration value at block 146 to generate an error signal. Output 144 corresponds to the actual deceleration signal as measured by deceleration sensor 52. The reference deceleration value is represented by block 148. The error signal is integrated with respect to time at block 150 and the result is supplied to compensation block 100 as input $U_4$, thus closing the control loop.

Inputs $u_1$, $u_2$, and $u_3$ provide a time base represented by blocks 152 and 154, the outputs of which are multiplied at block 156. Thus, the variable $u_1$ ramps from time "0" to time $t_1$, whereas variable $u_2$ ramps from time $t_1$ to time $t_2$, and variable $u_3$ ramps from time $t_2$ to time $t_3$.

The relative brake factors are determined by the system during a sequence of controlled braking maneuvers. Preferably, the vehicle operator initiates a controlled braking maneuver when the vehicle is traveling on a substantially level, dry surface. The vehicle is automatically decelerated to a controlled reference rate, which is measured by deceleration sensor 52, for a predetermined time interval. Since the vehicle mass is known, or has been assigned a value, the braking force required to decelerate the vehicle at the predetermined deceleration rate may be calculated. The delivered braking force is a function of this supplied pressure, wheel radius, number of braking sites, and relative brake factor. The only unknown, then, is the relative brake factor. However, since the system of the preferred embodiment includes three braking locations corresponding to the steer, drive, and trailer axles, three equations are required to determine the three unknown relative brake factors.

During the first controlled braking maneuver of the sequence, a predetermined set of proportioning factors ($F_1$, $F_2$, and $F_3$) are used. When the vehicle is decelerating at the predetermined reference deceleration rate, the braking pressure at each of the braking locations (steer, drive, and trailer axles) is measured by pressure transducers 46, 48 and 96 and recorded by ECU 40. Another controlled braking maneuver is then performed with a different selection of proportioning factors while the brake pressures at the various braking locations are again recorded by ECU 40. This process is repeated for each of the various braking locations to complete the sequence of controlled braking maneuvers. In a preferred embodiment having three such braking locations, the following set of simultaneous equations is solved to determine the three unknown relative brake factors:

$$BF_i \times F_{11} \times P_{11} + BF_2 \times F_{12} \times P_{12} + BF_3 \times F_{13} \times P_{13} = K.$$

$$BF_1 \times F_{21} \times P_{21} + BF_2 \times F_{22} \times P_{22} + BF_3 \times F_{23} \times P_{23} = K.$$

$$BF_1 \times F_{31} \times P_{31} + BF_2 \times F_{32} \times P_{32} + BF_3 \times F_{33} \times P_{33} = K.$$

where $BF_i$ for $i=1,2,3$ represents the relative brake factors, $F_{ij}$ for $i=1,2,3$ and $j=1,2,3$ represents the proportioning factors, $P_{ij}$ represents the measured braking pressures, and K represents the brake torque required to decelerate the vehicle at a known deceleration rate.

Figure 5:
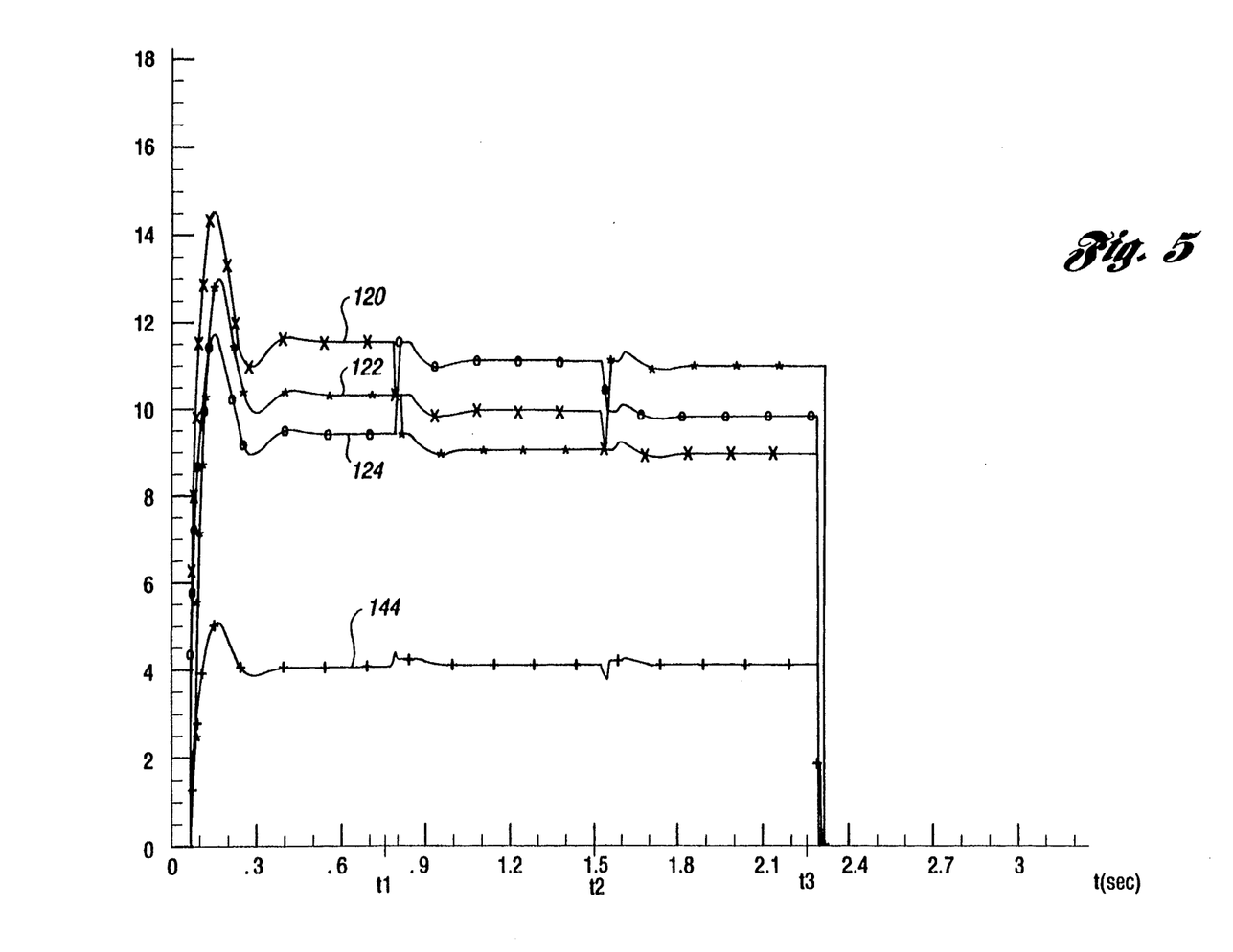
FIG. 5 is a graphical representation of the vehicle deceleration and braking pressure delivered to the various vehicle braking locations during a controlled braking maneuver according to the present invention.

FIG. 5 provides a graphical representation of the delivered braking pressures and vehicle deceleration during a sequence of controlled braking maneuvers. As is shown, the entire sequence may be completed in less than 2.5 seconds. This allows time for the various braking pressures to stabilize so that an accurate and repeatable determination of the brake factors may be completed. In operation, the vehicle operator initiates a controlled braking maneuver when the vehicle is traveling on a substantially level, dry surface. The vehicle is automatically decelerated to the controlled reference rate, which is measured by vehicle deceleration sensor 52, for a predetermined time interval. The closed-loop control system illustrated in FIG. 4 will modify the applied braking pressures so that the actual vehicle deceleration will be approximately equal to the reference deceleration rate.

During the sequence of controlled braking maneuvers, the delivered braking pressures at each of the steer, drive, and trailer axles are monitored by the corresponding pressure transducers 46, 48, and 96, as illustrated in FIG. 5 by lines 120, 122, and 124, respectively. The vehicle deceleration is also illustrated in FIG. 5 for reference purposes as indicated by line 144.

With continuing reference to FIG. 5, once the braking pressures have reached their steady state values, which, in a preferred embodiment, is approximately 300 milliseconds after initiation of the controlled braking maneuver, the braking pressures are sensed and stored in ECU 40. Approximately 750 milliseconds after initiation of the controlled braking maneuver, a new set of proportioning factors ($F_1$, $F_2$, and $F_3$) are used for the second braking maneuver which continues from time $t_1$ to time $t_2$. Again, once the braking pressures have stabilized, they are measured by the appropriate transducers and recorded in ECU 40. Likewise, from time $t_2$ to time $t_3$, a third set of proportioning factors is utilized and, after stabilization, the braking pressures are measured and recorded. The system of simultaneous equations is then solved to determine the relative brake factors for each braking location. The relative brake factors may then be utilized in subsequent braking maneuvers to balance the work performed at the various brake sites in decelerating the vehicle.

Figure 6:
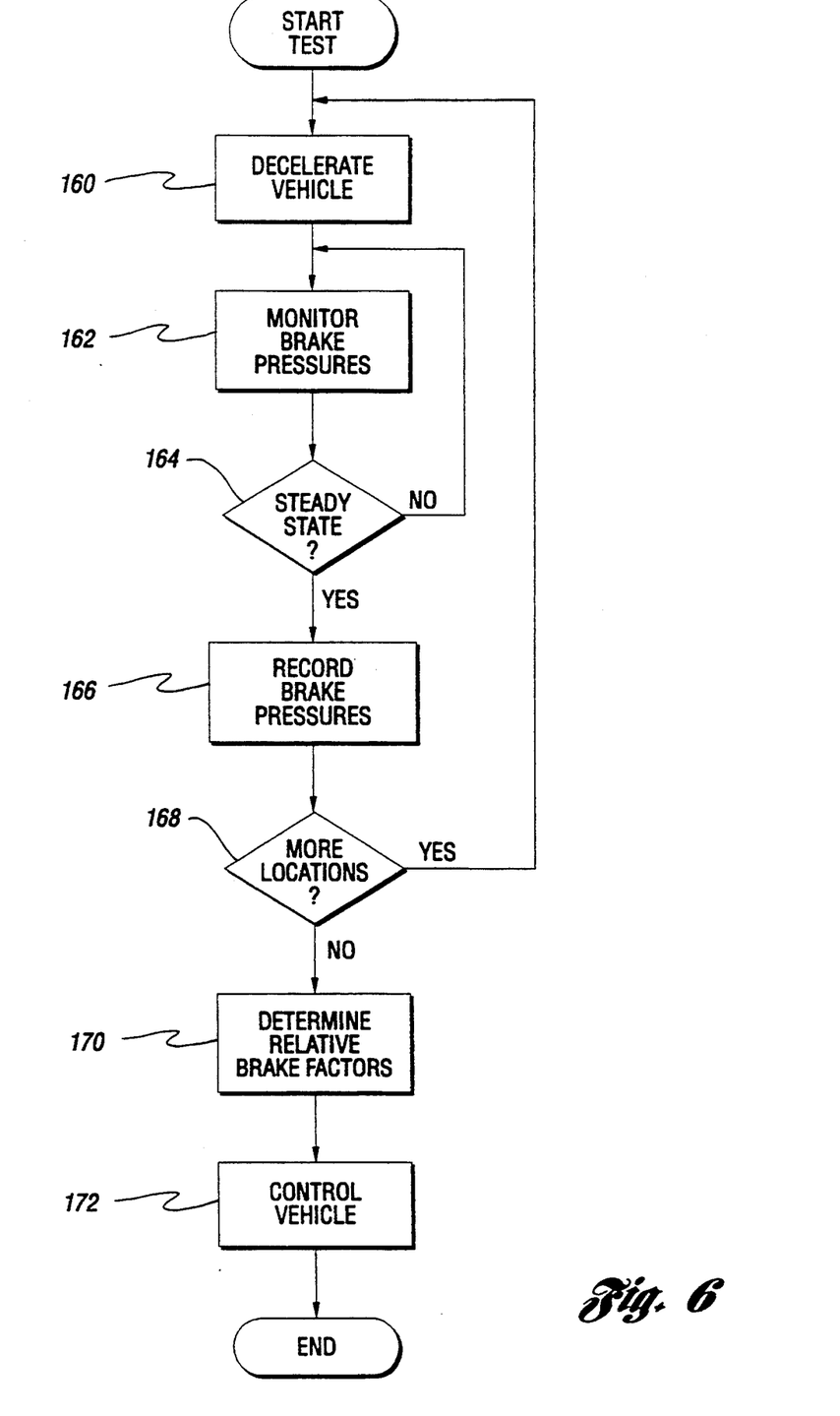
FIG. 6 is a flow chart illustrating the method for determining relative brake factors according to the present invention.

Referring now to FIG. 6, a flow chart illustrating the method for determining relative brake factors according to the present invention is shown. A vehicle operator initiates the sequence illustrated when conditions are appropriate for a brief controlled braking maneuver, such as when traveling on a dry, approximately level surface. Step 160 includes automatically decelerating the vehicle to a known reference deceleration rate. Preferably, the reference deceleration rate is chosen such that wheel slip does not occur. A reference deceleration rate of approximately 4 ft/s$^2$ is used in one embodiment of the present invention. At step 162, the applied braking pressures at each of the vehicle braking locations are monitored to detect the braking force necessary to bring the vehicle to the reference deceleration rate.

With continuing reference to FIG. 6, step 164 performs a test to determine whether steady state values have been reached. This test may consist of pausing for a predetermined time period, the length of which depends upon the response/settling time of the particular vehicle braking system. Alternatively, step 164 may consist of pausing until the change in applied braking pressure at each site is near zero, which allows for some noise in the signals from the pressure transducers, before proceeding to the next step. Once the pressures have stabilized, the braking pressures are read and recorded at step 166. Step 168 determines if the sequence should be repeated such that one repetition is formed for each braking location.

With continuing reference to FIG. 6, in one embodiment of present invention, the tractor semi-trailer vehicle includes three braking locations corresponding to the steer, drive, and trailer axles. After repeating the sequence for each of the braking locations, step 170 determines the relative brake factors by solving a system of simultaneous equations, as previously described. Step 172 includes controlling the vehicle based on the relative brake factors determined in step 170. The step of controlling the vehicle may include modifying the delivered braking pressures at various locations such that the work performed by each location in decelerating the vehicle is appropriately balanced.

It is understood, of course, that while the form of the invention herein shown and described constitutes a preferred embodiment of the invention, it is not intended to illustrate all possible forms thereof. It will also be understood that the words used are descriptive rather than limiting, and that various changes may be made without departing from the spirit and scope of the invention disclosed.

What is claimed is:

1. For use with a vehicle including an electronic control unit with memory and a plurality of axles, each axle with an associated plurality of braking sites controlled by the electronic control unit, a system for determining a plurality of brake factors during a controlled braking maneuver for the purpose of braking control during subsequent braking maneuvers, each of the plurality of brake factors corresponding to one of the plurality of axles and characterizing braking performance as a function of delivered braking pressure, the system comprising:

means for decelerating the vehicle at a predetermined rate during the controlled braking maneuver, the decelerating means delivering a braking pressure to each of the braking sites on at least one of the plurality of axles, the braking pressure being based on a predetermined proportioning factor;

means for sensing the braking pressure delivered to the braking sites on the at least one of the plurality of axles to obtain at least one braking pressure signal;

means for repeatedly decelerating the vehicle and sensing the braking pressure delivered to the braking sites once for each of the plurality of axles, each repetition having a different predetermined proportioning factor;

means for determining the brake factor of the braking sites on the at least one of the plurality of axles; and means for controlling vehicle braking during subsequent braking maneuvers based on the relative brake factor of the braking sites on the at least one of the plurality of axles.

2. The system of claim 1 wherein the vehicle includes a plurality of wheels and wherein the means for decelerating the vehicle comprises:

a sensor in communication with the electronic control unit for sensing the rate of change in velocity of the vehicle; and a pneumatically actuated braking system for retarding rotation of at least two of the plurality of wheels in response to control signals from the electronic control unit.

3. The system of claim 1 wherein the means for sensing comprises at least one pressure transducer in communication with the electronic control unit, the at least one pressure transducer generating a signal having a value proportional to the braking pressure being delivered to each of the braking sites on the at least one axle.

4. The system of claim i wherein the means for determining the brake factor comprises:

means for determining an estimated vehicle deceleration based on the at least one braking pressure signal;

means for sensing vehicle deceleration to obtain an actual vehicle deceleration signal;

means for comparing the estimated vehicle deceleration to the actual vehicle deceleration signal so as to generate an error signal;

means for modifying at least one of the braking pressures so as to reduce the error signal;

means for repeatedly comparing the estimated vehicle deceleration to the actual vehicle deceleration signal and modifying at least one of the braking pressures until the error signal is less than a predetermined value so as to obtain a steady-state estimated vehicle deceleration; and means for generating the brake factor based on the steady-state vehicle deceleration and the at least one braking pressure.

5. The system of claim 4 wherein the means for sensing vehicle deceleration comprises an accelerometer.

6. The system of claim 4 wherein the means for determining an estimated vehicle deceleration comprises:

means for determining braking torques exerted by the plurality of braking sites located at each of the plurality of vehicle axles;

means for summing the braking torques exerted on each vehicle axle to generate a total vehicle braking torque;

means for processing the total vehicle braking torque to determine a vehicle braking force; and means for multiplying the vehicle braking force by the reciprocal of the vehicle mass.

7. The system of claim 4 wherein the means for generating the brake factor comprises means for solving a set of simultaneous equations, each equation representing a single repetition of decelerating the vehicle and sensing the delivered braking pressures.

8. The system of claim 1 wherein the means for controlling vehicle braking comprises means for modifying the delivered braking pressure based on the brake factors.

9. The system of claim 1 wherein the means for controlling vehicle braking comprises at least one pressure control valve in communication with the electronic control unit, the control valve being operative to modify the delivered braking pressure based on at least one brake factor.

10. For use with a vehicle including an electronic control unit with memory and a plurality of axles, each axle with an associated plurality of braking sites controlled by the electronic control unit, a method for determining a plurality of brake factors during a controlled braking maneuver for the purpose of braking control during subsequent braking maneuvers, each of the plurality of brake factors corresponding to one of the plurality of axles and characterizing braking performance as a function of delivered braking pressure, the method comprising:

decelerating the vehicle at a predetermined rate during the controlled braking maneuver by delivering a braking pressure to each of the braking sites on at least one of the plurality of axles;

sensing the braking pressure delivered to the braking sites on the at least one of the plurality of axles to obtain at least one braking pressure signal;

repeating the above two steps once for each of the plurality of axles, each repetition having a different predetermined proportioning factor;

determining the brake factor of the braking sites on the at least one of the plurality of axles; and controlling vehicle braking during subsequent braking maneuvers based on the relative brake factor.

11. The method of claim 10 wherein the vehicle includes a plurality of wheels and wherein decelerating the vehicle comprises:

sensing the rate of change in velocity of the vehicle; and retarding rotation of at least two of the plurality of wheels in response to control signals from the electronic control unit utilizing a pneumatically actuated braking system.

12. The method of claim 10 wherein sensing the braking pressure comprises generating at least one signal having a value proportional to the braking pressure being delivered to each of the braking sites on the at least one axle where the at least one signal is generated by at least one pressure transducer in communication with the electronic control unit.

13. The method of claim 10 wherein determining the brake factor comprises:
   determining an estimated vehicle deceleration based on the at least one braking pressure signal;
   sensing vehicle deceleration to obtain an actual vehicle deceleration signal;
   comparing the estimated vehicle deceleration to the actual vehicle deceleration signal so as to generate an error signal;
   modifying at least one of the braking pressures so as to reduce the error signal;
   repeating the above two steps until the error signal is less than a predetermined value so as to obtain a steady-state estimated vehicle deceleration; and
   generating the brake factor based on the steady-state vehicle deceleration and the at least one braking pressure.

14. The method of claim 13 wherein generating the brake factor comprises solving a set of simultaneous equations, each equation representing a single repetition of decelerating the vehicle and sensing the delivered braking pressures.

15. The method of claim 13 wherein sensing vehicle deceleration comprises providing an accelerometer in communication with the electronic control unit.

16. The method of claim 13 wherein determining an estimated vehicle deceleration comprises:
   determining braking torques exerted by the plurality of braking sites located at each of the plurality of vehicle axles;
   summing the braking torques exerted on each vehicle axle to generate a total vehicle braking torque;
   processing the total vehicle braking torque to determine a vehicle braking force; and
   multiplying the vehicle braking force by the reciprocal of the vehicle mass.

17. The method of claim 10 wherein controlling vehicle braking comprises modifying the delivered braking pressure based on the brake factors.

18. The method of claim 10 wherein controlling vehicle braking comprises controlling at least one pressure control valve in communication with the electronic control unit, the control valve being operative to modify the delivered braking pressure based on at least one brake factor.

* * * * *

UNITED STATES PATENT AND TRADEMARK OFFICE
CERTIFICATE OF CORRECTION

PATENT NO. : 5,415,466

DATED : May 16, 1995

INVENTOR(S) : Michael T. Breen, Chia-Hsiang Lui

It is certified that error appears in the above-identified patent and that said Letters Patent is hereby corrected as shown below:

Column 9, line 51, claim 4, after "claim" and before "wherein" "i" should be --1--.

Signed and Sealed this

Twenty-ninth Day of August, 1995

Attest:

BRUCE LEHMAN

Attesting Officer     Commissioner of Patents and Trademarks